(12) United States Patent
Theoleyre

(10) Patent No.: US 7,067,014 B2
(45) Date of Patent: Jun. 27, 2006

(54) METHOD FOR PURIFYING BY NANOFILTRATION AN AQUEOUS SUGARY SOLUTION CONTAINING MONOVALENT AND POLYVALENT ANIONS AND CATIONS

(75) Inventor: Marc-Andrè Theoleyre, Paris (FR)

(73) Assignee: Applexion (FR)

( * ) Notice: Subject to any disclaimer, the term of this patent is extended or adjusted under 35 U.S.C. 154(b) by 0 days.

(21) Appl. No.: 10/526,826

(22) PCT Filed: Aug. 27, 2003

(86) PCT No.: PCT/FR03/02592

§ 371 (c)(1),
(2), (4) Date: Mar. 4, 2005

(87) PCT Pub. No.: WO2004/022787

PCT Pub. Date: Mar. 18, 2004

(65) Prior Publication Data

US 2005/0211240 A1    Sep. 29, 2005

(30) Foreign Application Priority Data

Sep. 6, 2002 (FR) .................................. 02 11042

(51) Int. Cl.
*C13D 3/14* (2006.01)
(52) U.S. Cl. .................................... 127/46.2
(58) Field of Classification Search ............... 127/46.2, 127/55
See application file for complete search history.

(56) References Cited

U.S. PATENT DOCUMENTS

| | | | |
|---|---|---|---|
| 2,937,959 A | | 5/1960 | Reents et al. |
| 5,254,174 A | | 10/1993 | Hansen et al. |
| 5,443,650 A | | 8/1995 | Saska et al. |
| 5,932,106 A | | 8/1999 | San Miguel Bento |
| 6,383,540 B1 | | 5/2002 | Noel |
| 6,475,390 B1 | * | 11/2002 | Durham et al. ............. 210/650 |
| 2003/0230301 A1 | * | 12/2003 | Theoleyre et al. ............. 127/9 |
| 2003/0230302 A1 | * | 12/2003 | Theoleyre et al. ............. 127/9 |

FOREIGN PATENT DOCUMENTS

| | | |
|---|---|---|
| JP | 63-177800 | 7/1988 |
| WO | WO 99/04903 | 2/1999 |

* cited by examiner

*Primary Examiner*—David Brunsman
(74) *Attorney, Agent, or Firm*—Gerald E. Hespos; Anthony J. Casella

(57) ABSTRACT

A purification method employs nanofiltration of an aqueous solution containing one or several sugars, multivalent cations, monovalent metal cations, monovalent anions and multivalent inorganic anions and/or organic acid anions. The method includes replacement of at least a part of said multivalent cations and/or said multivalent inorganic anions and organic acid anions respectively by monovalent metal cations and/or monovalent anions to produce a solution. Nanofiltration of the solution is carried out to obtain a retentate, and at least part of the retentate is subject to crystallization.

20 Claims, 1 Drawing Sheet

METHOD FOR PURIFYING BY NANOFILTRATION AN AQUEOUS SUGARY SOLUTION CONTAINING MONOVALENT AND POLYVALENT ANIONS AND CATIONS

This application is a national stage entry under section 371 of PCT/FR2003/02592, filed 27 Aug. 2003.

BACKGROUND OF THE INVENTION

1. Field of the Invention

The present invention relates to a purification method by nanofiltration of an aqueous solution containing one or several sugars, multivalent cations, monovalent metal cations, monovalent anions and multivalent inorganic anions and/or organic acid anions.

2. Description of the Related Art

The purification by demineralization of liquid products (such as a glucose syrup, sugar juices or whey) by means of ion-exchange resins has been known for many years.

The principle of such a demineralization is to make such a liquid product percolate through a cationic resin and an anionic resin, the counter-ion of the former being the H$^+$ ion and the counter-ion of the latter, the OH$^-$ ion.

While passing through the cationic resin, the cations of the liquid product are exchanged with the H$^+$ ions of the resin, and while passing through the anionic resin, the anions of the product are exchanged with the OH$^-$ ions of this resin, the H$^+$ and OH$^-$ ions thus released from said resins combining together to give water.

The regeneration of the resins thus used is performed by passing an acid through the cationic resin and a base through the anionic resin, and according to the regeneration outputs, the regeneration effluents can contain up to 2 to 3 times the inorganic load extracted from the treated liquid product.

Such highly saline effluents constitute indisputably a source of pollution.

In short, the demineralization of liquids containing inorganics by means of ion-exchange resins calls for the use of an acid and of a base for their regeneration. Besides the cost of these chemicals, this demineralization procedure produces pollutant saline effluents, the processing of which is expensive.

Moreover, the nanofiltration technique is generally used as pre-concentration means of aqueous solutions containing inorganics. The monovalent ions of these inorganics migrate through the nanofiltration membrane and therefore most of them are found in the permeate, whereas their multivalent ions are retained by this membrane and most of them are found concentrated in the retentate; a purification effect by demineralization is thus obtained, which remains however insufficient.

SUMMARY OF THE INVENTION

The aim of the present invention is the development of a purification method, economical in energy and in chemicals and limiting the quantity and the number of produced effluents.

The basic idea of this method lies in the modification of the ionic composition, without demineralization, of the aqueous solution to be treated in order to improve the demineralization effect of a nanofiltration carried out on the thus modified aqueous solution.

Thus, the present invention relates to a purification method of an aqueous solution containing one or several sugars, multivalent cations, monovalent metal cations, monovalent anions and multivalent inorganic anions and/or organic acid anions, such as lactate and citrate, characterized in that it comprises the operations:

(a) of replacement of at least a part of said multivalent cations and/or of said multivalent inorganic anions and organic acid anions respectively by monovalent metal cations and/or monovalent anions, in order to obtain an aqueous solution depleted in multivalent cations and/or multivalent inorganic anions and organic acid anions, and containing said monovalent metal cations and/or said monovalent anions, (b) of nanofiltration of the solution resulting from operation (a) in order to obtain as a retentate, a sugar aqueous juice enriched in sugars, in multivalent cations and in multivalent inorganic anions and/or in organic acid anions, and as a permeate, an aqueous effluent containing most of the monovalent anions and monovalent metal cations, (c) of additional demineralization of at least a part of the retentate obtained by operation (b), with a cation-exchange resin of which the counter-ion is H$^+$ and an anion-exchange resin of which the counter-ion is OH$^-$, these resins thus charging themselves respectively in residual cations and anions of the retentate, and (d) of regeneration, on one hand, of said cation-exchange resin by means of a inorganic acid of which the anion is of the same type as the monovalent anions present in the initial aqueous solution, and on the other hand, of said anion-exchange resin by means of a inorganic base of which the cation is of the same type as the monovalent metal cations present in the initial aqueous solution, which produces regenerated exchange resins and two regeneration effluents preponderantly containing monovalent anions and monovalent metal cations.

Operation (a) above provides an aqueous solution enriched in monovalent anions and/or monovalent metal cations and greatly depleted in multivalent cations and in multivalent inorganic anions and/or organic acid anions.

During operation (b), the sugars of the aqueous solution resulting from operation (a) are found in the retentate in which are also principally found the remaining multivalent cations and the remaining multivalent inorganic anions and/or organic acid anions. As for the monovalent ions, most of them are found in the permeate.

It is to be noted that thanks to prior operation (a), which does not constitute in itself a demineralization procedure, the proportion of the monovalent ions relatively to the multivalent ions and organic acid anions is increased in the aqueous solution, which causes an increase of the demineralization ratio of said aqueous solution during operation (b).

When one tries to preferably eliminate the multivalent cations present in the aqueous solution to be purified, in operation (a) the replacement of the multivalent cations is advantageously performed simultaneously to the replacement of the multivalent inorganic anions and/or organic acid anions, or still more advantageously performed on the aqueous solution having beforehand undergone the replacement of the multivalent inorganic anions and/or organic acid anions.

Moreover, when one tries to preferably eliminate the multivalent inorganic anions and/or organic acid anions present in the aqueous solution to be purified, in operation (a) the replacement of the multivalent inorganic anions and/or organic acid anions is advantageously performed simultaneously to the replacement of the multivalent cations or still more advantageously performed on the aqueous solution having beforehand undergone the replacement of the multivalent cations.

According to a preferred embodiment of the invention, replacement procedure (a) comprises the processing of the aqueous solution with a cationic resin of which the counter-ion is a monovalent metal cation and/or with an anionic resin of which the counter-ion is a monovalent anion.

Moreover, the monovalent metal cation forming the counter-ion of the cationic resin and the monovalent anion forming the counter-ion of the anionic resin are preferably of the same type as, respectively, said monovalent metal cations and said monovalent anions present in the initial aqueous solution; this prevents the introduction of foreign ions in the process and makes more advantageous, as it will be seen below, the regeneration operations of the aforementioned cationic and anionic resins.

According to an important characteristic of the present invention, this method preferably also comprises an operation:

(e) of regeneration of the cationic and/or anionic resin(s), particularly by processing of the same by a permeate obtained during nanofiltration operation (b) above, this permeate being concentrated beforehand to the desired degree.

In proceeding that way, use is made, for the regeneration, of the monovalent ions initially present in the aqueous solution to be purified; this prevents the use of costly chemicals foreign to the method and limits the production of polluting effluents.

According to various alternatives, the method according to the invention can further comprise one or several of the following operations:

(f) chromatography of a part of the retentate resulting from operation (b), in order to obtain an effluent enriched in sugar and a raffinate enriched in monovalent anions and monovalent metal cations;

(g) processing of the permeate resulting from operation (b), by reverse osmosis or electrodialysis in order to produce water and an aqueous fraction enriched in monovalent anions and monovalent metal cations.

It will be noted that according to another characteristic of the method of the present invention, the cationic resin and/or the anionic resin can be regenerated by processing the same with at least one of the following liquids, possibly concentrated, combined to at least a part of the permeate obtained during operation (b): effluents obtained during operation (d), raffinate obtained during operation (f), aqueous fraction obtained during operation (g).

The method according to the invention can be used in particular for the purification of a whey, of a permeate resulting from the ultrafiltration of a whey or of a sugar beetroot juice, of sugarcane juice, of chicory juice or of Jerusalem Artichokes juice, this whey, permeate or juice comprising $Ca^{2+}$ and $Mg^{2+}$ ions, $Cl^-$ anions, $Na^+$ and $K^+$ cations and anions selected mainly in the group consisting in phosphate and sulfate anions, anions from organic acids and their mixtures.

BRIEF DESCRIPTION OF THE DRAWING

The present invention is illustrated hereafter, in a non limitative manner, by the description of a purification example, done with reference to the unique FIGURE which is the schematic representation of an installation for the carry out of the method according to the invention.

DETAILED DESCRIPTION OF THE PREFERRED EMBODIMENT

Figure 1:
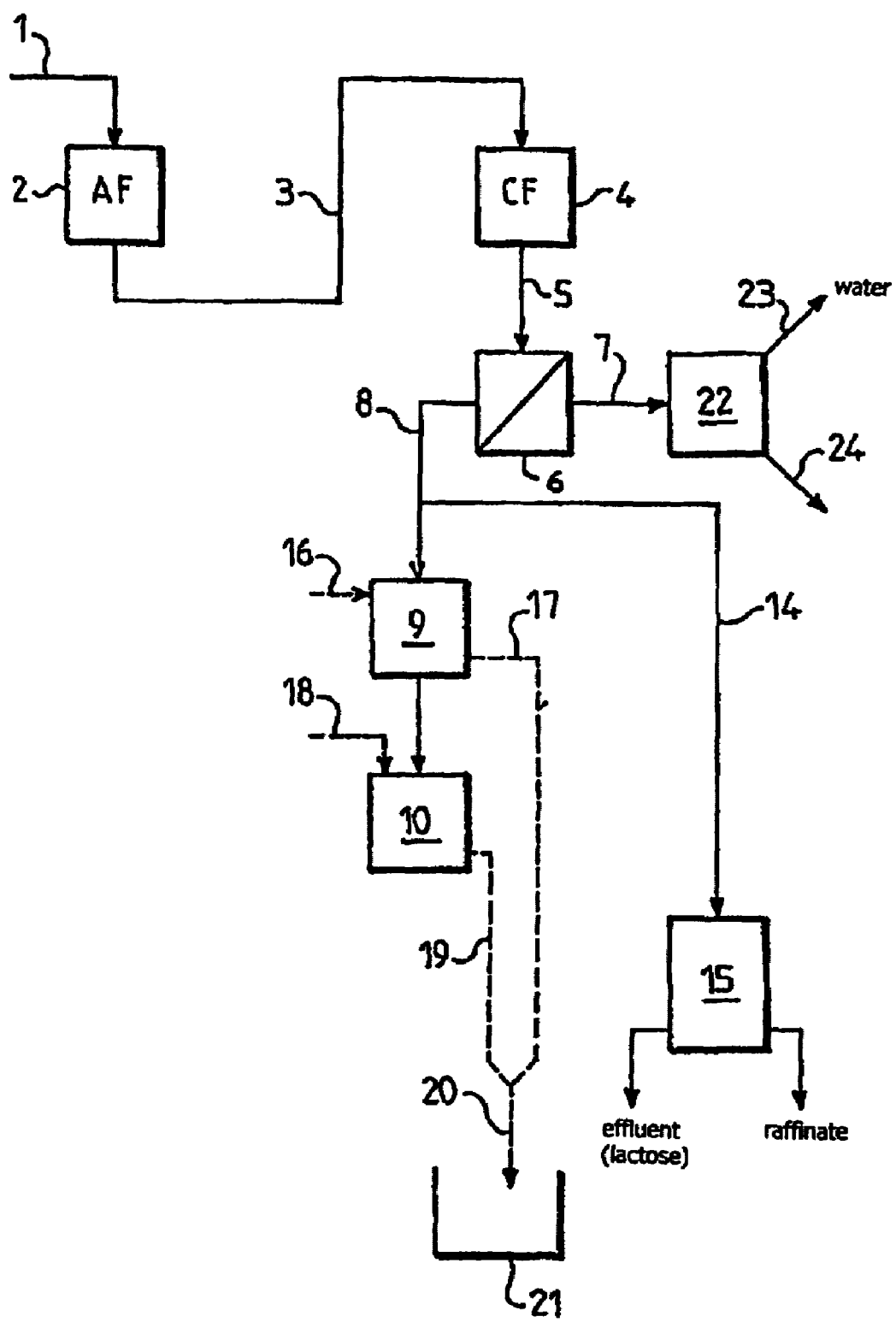

The aqueous solution subject to this method is in the selected example a permeate obtained by ultrafiltration of a whey. Such a permeate comprises mainly lactose, organic acids and inorganics (particularly $Na^+$, $K^+$, $Ca^{2+}$, $Mg^{2+}$ cations, $Cl^-$ and phosphate anions and organic acid anions, such as citrate and lactate).

This permeate is carried by a duct 1 to the entrance of a column 2 filled with a strong anionic resin (AF), then from the exit of this column 2 by a duct 3 to the entrance of a column 4 filled with a strong cationic resin (CF).

The strong cationic resin is in the $Na^+$ or $K^+$ form, i.e. its counter-ion is the $Na^+$ or $K^+$ ion; the strong anionic resin is in the $Cl^-$ form, i.e. its counter-ion is the $Cl^-$ ion.

It will be noted that, as an alternative, both these resins could be used in a mixture, in which case a single column would be sufficient.

During the passage of the permeate through the anionic resin, it exchanges its multivalent inorganic anions (phosphate) and organic acid anions (lactate, citrate) with the $Cl^-$ ions of the resin; during its passage through the cationic resin, it exchanges its multivalent cations ($Ca^{2+}$, $Mg^{2+}$) with the $Na^+$ or $K^+$ ions of the resin.

The permeate is therefore relieved from a substantial part of its multivalent inorganic cations and anions and of its organic acid anions, which cations and anions have been replaced by monovalent cations and anions; this permeate therefore mainly contains lactose, $Na^+$, $K^+$ and $Cl^-$ ions, residual $Ca^{2+}$, $Mg^{2+}$ cations, residual phosphate anions and residual organic acid anions.

The aqueous solution coming from column 4 is then carried by a duct 5 in a nanofiltration device 6 comprising one or several nanofiltration membranes permeable to the monovalent ions, but retaining the lactose, the multivalent ions and the organic acid ions.

Thus, are coming from device 6:
on one hand, by duct 7, a permeate enriched in $Cl^-$, $Na^+$ and $K^+$ ions, and
on the other hand, by duct 8, a retentate enriched in lactose and in residual phosphate anions, residual anions from organic acids and residual $Ca^{2+}$ and $Mg^{2+}$ cations; this retentate further contains a small quantity of $Na^+$, $K^+$ and $Cl^-$ ions.

Moreover, duct 8 is connected to a demineralization unit of the nanofiltration retentate, unit in which a part of this retentate is treated.

This unit comprises a column 9 filled with a cation-exchange resin, of which the counter-ion is $H^+$, followed in series by a column 10 filled with an anion-exchange resin, of which the counter-ion is $OH^-$.

On the cation-exchange resin, a substantial part of the monovalent cations ($Na^+$, $K^+$) and of the residual multivalent $Ca^{2+}$ and $Mg^{2+}$ cations is retained; on the anion-exchange resin, a substantial portion of the $Cl^-$ anions, of the phosphate anions and of the residual organic acid anions (lactate, citrate) is retained.

At the exit of column 10, we therefore have a sugar aqueous solution practically totally demineralized.

A part of the nanofiltration retentate can be subject to a chromatography. For this purpose, a branching 14 is provided on duct 8, this branching leading to the entrance of a chromatography column 15. Is extracted from the latter, on one hand, an effluent enriched in lactose and on the other hand a raffinate enriched in inorganics (mainly $Na^+$, $K^+$ and $Cl^-$).

It will be noted that the cation-exchange resin filling column 9 can be regenerated by hydrochloric acid carried by a duct 16 to the top of column 9. The $H^+$ ions of this acid replace the monovalent $Na^+$ or $K^+$ cations and multivalent $Ca^{2+}$, $Mg^{2+}$ cations which have been retained on this resin during the passage of the nanofiltration retentate through it. It results in a first regeneration effluent extracted by a duct 17 and containing $H^+$ (HCl in excess), $Na^+$, $K^+$, $Ca^{2+}$, $Mg^{2+}$, and $Cl^-$ ions.

Likewise, the anion-exchange resin filling column 10 can be regenerated by a soda aqueous solution carried by a duct 18. The $OH^-$ ions of the soda replace the $Cl^-$, phosphate, lactate and citrate anions, which have been retained on this resin during the passage through it of the nanofiltration retentate coming from column 9. It results in a second regeneration effluent extracted from column 10 by a duct 19 and containing $Cl^-$, phosphate, lactate and citrate, $Na^+$ and $OH^-$ (soda in excess) ions.

The first and second regeneration effluents are then brought together by a duct 20 and received in a container 21.

It will be noted that the nanofiltration permeate removed from duct 7 can be treated in a reverse osmosis unit 22 in order to obtain, on one hand, water extracted by duct 23, and on the other hand, an aqueous fraction (removed by duct 24) concentrated in $Na^+$, $K^+$ and $Cl^-$ ions.

As it is evident from the foregoing, we have a whole range of liquids produced during the method and advantageously usable, if necessary after concentration, for the regeneration of the strong cationic resin and of the strong anionic resin filling columns 2 and 4.

That is:

a fraction of the nanofiltration permeate removed by duct 7, the saline aqueous fraction removed from the reverse osmosis unit by duct 24, a fraction of the nanofiltration retentate, raffinate from chromatography unit 15, regeneration effluents received in container 21.

It will be specified that according to the monovalent $Na^+$, $K^+$ and $Cl^-$ cations and anions content of these different liquids usable for the regeneration of the resins of columns 2 and 4, this regeneration will be able to be performed either in series or in parallel.

It will be noted however that the regeneration in parallel is especially preferred because it prevents all risk of precipitation of insoluble salts, such as calcium phosphate, on the strong cationic resin present in column 4.

However, the regeneration in series of both resins is possible on the condition that the pH is controlled in order to prevent any risk of precipitation on the resins.

A liquid perfectly suitable for a regeneration in parallel is formed by the effluents received in container 21 which are highly charged in $Na^+$, $K^+$ and $Cl^-$ ions issued, for a non negligible part, from the hydrochloric acid and soda used for the regeneration of the resins filling columns 9 and 10.

Moreover, the table hereafter shows the influence of the type of decalcification prior to the nanofiltration, on the performance of this nanofiltration, the liquid treated being a permeate resulting from the ultrafiltration of a whey (designated whey permeate in this table), the nanofiltration concentration factor being of 4 and the nanofiltration membrane being of the type DESAL 5, from American company OSMONICS.

TABLE

| | Whey permeate | Nanofiltration retentate | | |
|---|---|---|---|---|
| | | Control | CF | AF then CF |
| dry matter (g/l) | 50.0 | 187 | 187 | 187 |
| total cations (eq./kg of dry matter) | 1.7 | 1.22 | 1.14 | 0.90 |
| total reduction ratio of the cations (%) | | 28 | 33 | 47 |

Control: total absence of decalcification before the nanofiltration
CF: decalcification by passage through a strong cationic resin (SR1 LNA from American company Rohm and Haas).
AF then CF: decalcification by passage through in series on a strong anionic resin (IRA 458 from American company Rohm and Haas) then through a strong cationic resin.

The data contained in this table shows that the total reduction ratio of the cations is increased when only the CF system is used, and particularly increased when the AF-CF system is used; this table therefore shows the strong influence on the performances of the nanofiltration of a prior reduction of the content in multivalent cations, in multivalent inorganic anions and in organic acid anions able to form complexes with said multivalent cations.

The invention claimed is:

1. Purification method by nanofiltration of an aqueous solution containing one or several sugars, multivalent cations, monovalent metal cations, monovalent anions and multivalent inorganic anions and/or organic acid anions, characterized in that it comprises the operations:
    (a) of replacement of at least a part of said multivalent cations and/or of said multivalent inorganic anions and organic acid anions respectively by monovalent metal cations and/or monovalent anions, in order to obtain an aqueous solution depleted in multivalent cations and/or multivalent inorganic anions and organic acid anions, and containing said monovalent metal cations and monovalent anions,
    (b) of nanofiltration of the solution resulting from operation (a) in order to obtain as a retentate, a sugar aqueous juice enriched in sugars, in multivalent cations and in multivalent inorganic anions and/or in organic acid anions, and as a permeate, an aqueous effluent enriched in monovalent anions and monovalent metal cations,
    (c) of additional demineralization of at least a part of the retentate obtained by operation (b), with a cation-exchange resin of which the counter-ion is $H^+$ and an anion-exchange resin of which the counter-ion is $OH^-$, these resins thus charging themselves respectively in residual cations and anions of the retentate, and
    (d) of regeneration, on one hand, of said cation-exchange resin by means of a inorganic acid of which the anion is of the same type as the monovalent anions present in the initial aqueous solution, and on the other hand, of said anion-exchange resin by means of a inorganic base of which the cation is of the same type as the monovalent metal cations present in the initial aqueous solution, which produces regenerated exchange resins and two regeneration effluents mainly containing monovalent anions and monovalent metal cations.

2. Method according to claim 1, characterized in that in operation (a), the replacement of the multivalent cations is performed simultaneously to the replacement of the multivalent inorganic anions and/or organic acid anions, or performed on the aqueous solution having undergone beforehand the replacement of the multivalent inorganic anions and/or organic acid anions.

3. Method according to claim 2, characterized in that replacement operation (a) comprises the processing of the aqueous solution with a cationic resin of which the counter-ion is a monovalent metal cation and/or with an anionic resin of which the counter-ion is a monovalent anion.

4. Method according to claim 3, characterized in that the monovalent metal cation forming the counter-ion of the cationic resin and the monovalent anion forming the counter-ion of the anionic resin are of the same type as, respectively, said monovalent metal cations and said monovalent anions present in the initial aqueous solution.

5. Method according to claim 4, characterized in that it further comprises an operation:
(e) of regeneration of the cationic resin and/or of the anionic resin.

6. Method according to claim 5, characterized in that regeneration operation (e) comprises the processing of the cationic resin and/or of the anionic resin with a permeate obtained during nanofiltration operation (b), after concentration of it to the desired degree.

7. Method according to claim 6, characterized in that it further comprises an operation:
(f) of chromatography of a part of the retentate resulting from operation (b), in order to obtain an effluent enriched in sugar and a raffinate enriched in monovalent anions and monovalent metal cations.

8. Method according to claim 7, characterized in that it further comprises an operation:
(g) of processing of the permeate resulting from operation (b), by reverse osmosis or electrodialysis in order to produce water and an aqueous fraction enriched in monovalent anions and monovalent metal cations.

9. Method according to claim 8, characterized in that it comprises an operation:
of regeneration of the cationic resin and/or of the anionic resin by processing the same with at least one of the following liquids, possibly concentrated, combined to at least a part of the permeate obtained during operation (b): effluents obtained during operation (d), raffinate obtained during operation (f), aqueous fraction obtained during operation (g).

10. Method according to claim 1, characterized in that in operation (a), the replacement of the multivalent inorganic anions and/or organic acid anions is performed simultaneously to the replacement of the multivalent cations or performed on the aqueous solution having undergone beforehand the replacement of the multivalent cations.

11. Method according to claim 10, characterized in that replacement operation (a) comprises the processing of the aqueous solution with a cationic resin of which the counter-ion is a monovalent metal cation and/or with an anionic resin of which the counter-ion is a monovalent anion.

12. Method according to claim 11, characterized in that the monovalent metal cation forming the counter-ion of the cationic resin and the monovalent anion forming the counter-ion of the anionic resin are of the same type as, respectively, said monovalent metal cations and said monovalent anions present in the initial aqueous solution.

13. Method according to claim 12, characterized in that it further comprises an operation:
(e) of regeneration of the cationic resin and/or of the anionic resin.

14. Method according to claim 13, characterized in that regeneration operation (e) comprises the processing of the cationic resin and/or of the anionic resin with a permeate obtained during nanofiltration operation (b), after concentration of it to the desired degree.

15. Method according to claim 14, characterized in that it further comprises an operation:
(f) of chromatography of a part of the retentate resulting from operation (b), in order to obtain an effluent enriched in sugar and a raffinate enriched in monovalent anions and monovalent metal cations.

16. Method according to claim 15, characterized in that it further comprises an operation:
(g) of processing of the permeate resulting from operation (b), by reverse osmosis or electrodialysis in order to produce water and an aqueous fraction enriched in monovalent anions and monovalent metal cations.

17. Method according to claim 16, characterized in that it comprises an operation:
of regeneration of the cationic resin and/or of the anionic resin by processing the same with at least one of the following liquids, possibly concentrated, combined to at least a part of the permeate obtained during operation (b): effluents obtained during operation (d), raffinate obtained during operation (f), aqueous fraction obtained during operation (g).

18. The method according to claim 1, of the purification of a whey, of a permeate resulting from the ultrafiltration of a whey or of a sugar beetroot juice, of a sugarcane juice, of a chicory juice or of a Jerusalem Artichokes, this whey, permeate or juice comprising $Ca^{2+}$ and $Mg^{2+}$ ions, $Cl^-$ anions, $Na^+$ and $K^+$ cations and anions selected mainly in the group consisting in the phosphate and sulfate anions, anions from organic acids and their mixtures.

19. Method according to claim 1, characterized in that replacement operation (a) comprises the processing of the aqueous solution with a cationic resin of which the counter-ion is a monovalent metal cation and/or with an anionic resin of which the counter-ion is a monovalent anion.

20. Method according to claim 1, characterized in that it further comprises an operation:
(f) of chromatography of a part of the retentate resulting from operation (b), in order to obtain an effluent enriched in sugar and a raffinate enriched in monovalent anions and monovalent metal cations.

* * * * *